United States Patent [19]

Brownlie

[11] 4,171,589
[45] Oct. 23, 1979

[54] SNARE TYPE ANIMAL TRAP

[76] Inventor: Kenneth G. Brownlie, 267 Roberta Ave., Winnipeg, Canada, R2K 0K2

[21] Appl. No.: 839,423

[22] Filed: Oct. 5, 1977

[51] Int. Cl.² ................... A01M 23/24; A01M 23/34
[52] U.S. Cl. ................................................. 43/87
[58] Field of Search ................................ 43/85, 86, 87

[56] References Cited

U.S. PATENT DOCUMENTS 4,069,612  1/1978  King .......................................... 43/87

FOREIGN PATENT DOCUMENTS 209565   7/1957   Australia ......................................... 43/87
243872  12/1925   United Kingdom ........................... 43/87

Primary Examiner—Jimmy C. Peters
Attorney, Agent, or Firm—Stanley G. Ade

[57] ABSTRACT

Animal traps consist of either snare type traps or jaw type traps. Snares are difficult to set inasmuch as they have to be situated not only where the animal will pass through the snare, but so that the snare will pull tight thus trapping the animal. Jaw type traps, although efficient at trapping animals, are usually not particularly humane in their action and snares also suffer from this disadvantage. The present trap incorporates a snare loop held by spring arms and is set by a trigger mechanism so that when the snare loop is pulled slightly as by an animal engaging the loop, the trigger releases and the spring arms move apart rapidly thus snapping the loop closed with considerable force and killing the animal instantaneously.

12 Claims, 6 Drawing Figures

SNARE TYPE ANIMAL TRAP

BACKGROUND OF THE INVENTION

This invention relates to new and useful improvements in animal traps and combines the advantages of the spring type trap with the advantages of a snare type trap.

Both types of trap have several advantages and the present device incorporates advantages of both types. It comprises a pair of arms normally biassed apart by a relatively heavy duty spring. A snare loop is connected to a trigger mechanism which holds the arms together in a trap set position. When the snare loop is pulled slightly as by an animal entering the snare, the trigger is released and the two arms spring apart violently thus snapping the snare loop closed and the animal is pulled up against one of the arms and killing it instantly.

SUMMARY OF THE INVENTION

The principal object and essence of the invention is therefore to provide a device of the character herewithin described which combines the advantage of snares with the advantages of spring actuated traps.

Another object of the invention is to provide a device of the character herewithin described in which the snare loop is snapped closed rapidly when the trap is released thus killing the animal instantaneously.

Still another object of the invention is to provide a device of the character herewithin described which enables the trap to be used in various locations and to be set rapidly and easily.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

In the drawings like characters of reference indicate corresponding parts in the different figures.

DETAILED DESCRIPTION

Proceeding therefore to describe the invention in detail, reference to the drawings will show that the trap consists of a pair of arms 10 and 11 which are connected at the ends 12 thereof by means of several coils of heavy duty spring material 13 and in the present embodiment, these coil springs are formed integrally with the arms 10 and 11.

Figure 2:
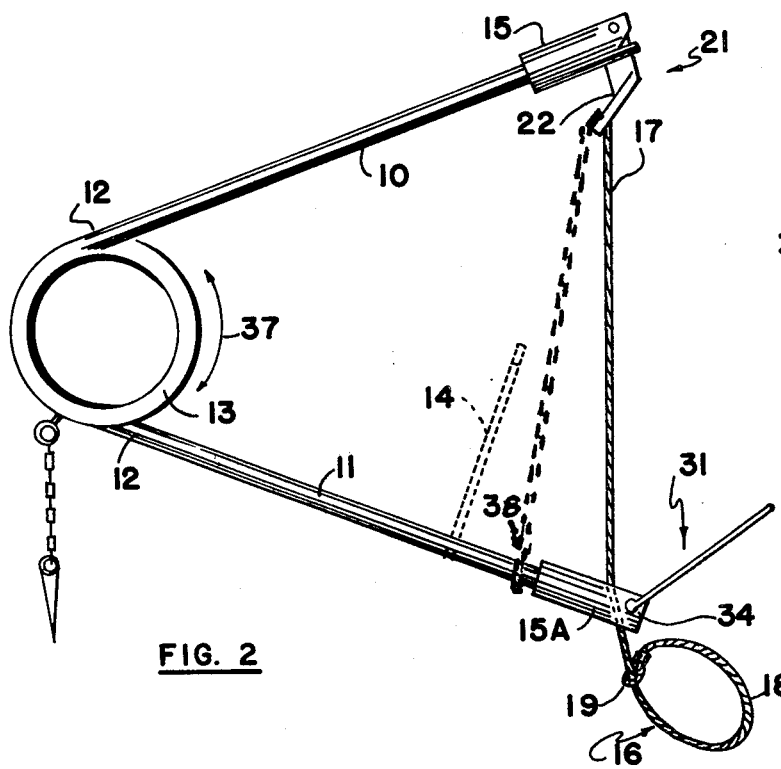
FIG. 2 in a side elevation of the trap in the release position.

However, alternatively, the ends 12 of the arms may be pivotally secured together with a heavy duty spring which reacts between the arms. In any event, the spring 13 normally biasses the arms to the trap release position shown in FIG. 2, and a keeper link 14, shown in phantom, may hold the arms in the trap set position to facilitate storage and transportation as well as to facilitate the setting of the trap.

Figure 1:
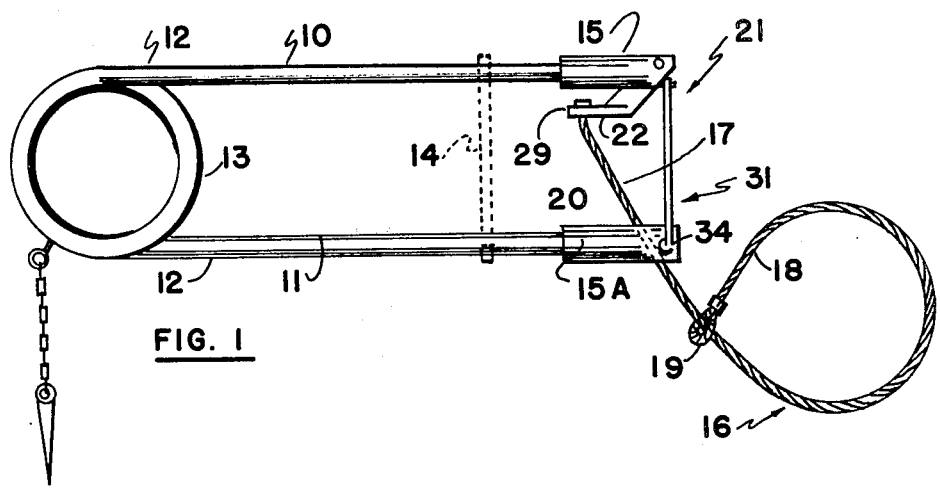
FIG. 1 is a side elevation of the trap in the set position.

A substantially cylindrical component 15 is secured upon one end of the arm 10 and a similar type of component 15A is secured upon one end of the arm 11 so that when in the trap set position in FIG. 1, these components are in substantially spaced and parallel relationship one with the other.

A snare component collectively designated 16 is provided and is formed from a length of flexible material such as wire, cord or the like. It includes an attaching end 17 with the other end being formed into a sliding snare loop 18, a ring 19 or the like being secured to the other end of the snare material and engaging around the attaching end 17 as clearly shown.

This attaching end passes through guide means in the component 15A and in the present embodiment, the guide means takes the form of a drilling 20 formed through the component 15A at an angle as clearly shown in FIG. 1.

Trigger means are provided collectively designated 21 and includes a trigger level 22. This trigger lever includes a release portion 23 pivoted within the open end 24 of the component 15, by means of pivot pin 25.

Figure 3:
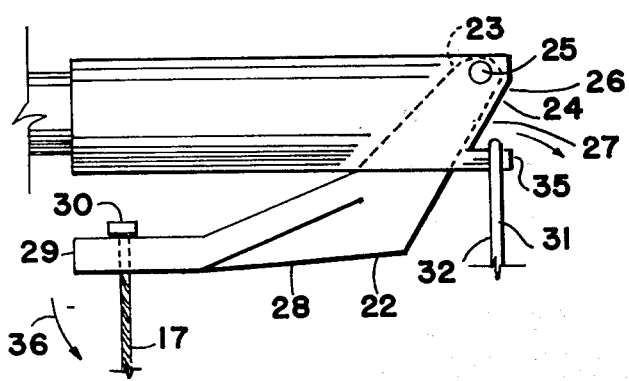
FIG. 3 is an enlarged side elevation of the trigger mechanism in the set position.

This open end is provided with cut-away sides 26 so that the forward edge 27 of the portion 23 extends across the cut-away portion as clearly shown in FIG. 3. The material forming the trigger lever 23 is then twisted through 90° and then at an angle from the longitudinal axis of the portion 23 thus providing a snare material attaching portion 28 which lies under the component 15 in substantially parallel relationship therewith and the attaching end 17 of the snare wire or material, after passing through the guide aperture 20, is secured adjacent the distal end 29 of this portion 28 by means of an enlargement 30 being formed on the distal end of the snare material, this end passing through a drilling within the portion 28.

A trigger bail 31 is formed from a U-shaped length of wire or the like and is provided with spaced and parallel legs 32 and cross bar 33. It is pivotally secured by the distal end of the legs 32, to offstanding pins 34 extending from the member 15A as clearly shown in FIGS. 1 and 4.

Figure 4:
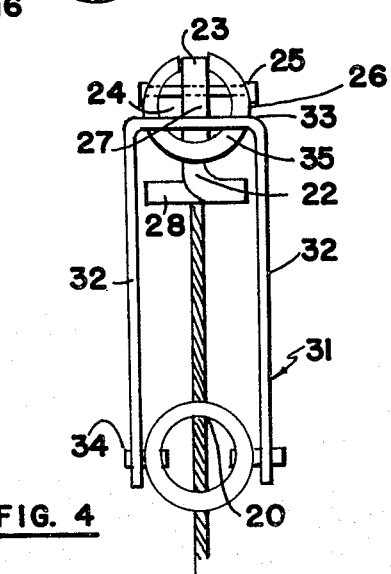
FIG. 4 is an end view of the trigger mechanism in the set position.

The cross bar 39 detachably engages the ledges 35 formed at the base of the cut-away portion 26 of the component 15 as clearly illustrated in FIGS. 3 and 4 and when in the trap set position illustrated, it will be noted that the forward edge 27 of the trigger lever portion 23 engages this cross bar 33.

In operation, the trigger assembly is set as described and illustrated and the snare loop is extended to its fullest amount and set within the path that the animal may traverse. As soon as the animal enters the snare loop, the snare loop is pulled and this pulls the portion 28 of the trigger lever in the direction of arrow 36. This causes the leading or forward edge 27 of the portion 23 to push the cross bar 33 of the trigger bail off of the ledges 35 thus allowing the spring 13 to force the arms apart violently in the direction of double-headed arrow 37 so that they take up the position shown in FIG. 2. This, of course, pulls the snare loop tightly around the neck of the animal with considerable force and snaps the animal against the portion 15A thus killing it instantaneously.

It should, of course, be understood that the link 14 is removed after the trap is set, otherwise it cannot be sprung.

Figure 5:
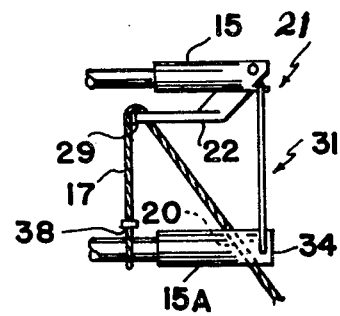
FIG. 5 is a fragmentary view of FIG. 1 showing an alternative embodiment.

In FIG. 5, an alternative method of connecting the snare component 16 is provided.

The attaching end 17, instead of being secured to the trigger lever 22, freely passes through an aperture (not illustrated) therein and then extends to the other arm 11 adjacent the distal end thereof. The attaching end is looped around this other arm 11 and is secured by means of a clip or clamp 38. This doubles the effective speed of operation or movement of the snare wire when the trap is sprung. In other words, the loop is closed with only half of the opening movement of the arms 10 and 11. This alternative is also shown in phantom in FIG. 2.

This embodiment is particularly suitable for use with relatively large or heavy traps which are difficult to set. With this arrangement a stick or the like can be engaged through the loop of the snare and the operator can stand on the ends of the stick. The trap can then be pulled to the closed or set position and the keeper engaged. The force of pull is reduced due to the block and tackle effect produced by this arrangement.

Figure 6:
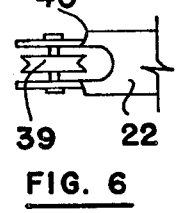
FIG. 6 is a fragmentary plan view of the preferred embodiment of the distal end of the trigger lever.

Finally reference to FIG. 6 will show a small pulley or wheel 39 mounted within the bifurcated end 40 formed on the distal end 29 of the trigger lever 22 which facilitates the movement of the snare material when setting the trap or when same is sprung.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An animal trap comprising in combination a pair of arms, a first arm and a second arm, operatively connected together by the inner ends thereof, spring means reacting between said arms and normally urging the distal end of said first arm away from the corresponding distal end of said second arm, a snare component, said component being formed of a length of flexible snare material and having an attaching end portion and a sliding loop portion formed on one end of said attaching end portion to form a snare loop, trigger means detachably holding said distal ends of said arms in a trap set position against pressure of said spring means, said attaching end portion of said snare component being operatively connected to said trigger means whereby a pull on said snare loop releases said trigger means so that the said distal ends of said arms are urged away from one another by said spring means to a trap release position, thereby closing said sliding loop, said trigger means including a trigger lever pivoted by one end to the distal end of said first arm, a trigger bail pivotally secured by one end to the distal end of said second arm, said bail including a cross arm, said distal end of said first arm being open and having a ledge formed thereon, said trigger lever being pivoted within the open end of said first arm, said trigger lever lying adjacent the inner surface of said first arm and towards said inner end of said first arm when in the trapped said position, said cross arm of said bail engaging said ledge when in the trapped said position and being engageable by said trigger lever, said attaching end portion of said snare component being operatively connected to the distal end of said trigger lever, and guide means for said snare material on said second arm adjacent said bail, pivotal movement of said trigger lever in one direction caused by a pull on said snare component disengaging said cross bar of said bail from said ledge of said first arm.

2. The trap according to claim 1 in which said spring means is formed upon the other ends of said arms and connects same together.

3. The trap according to claim 1 in which said guide means comprises a guide aperture through said second arm adjacent said one end thereof, said snare material passing freely through said guide aperture.

4. The trap according to claim 2 in which said guide means comprises a guide aperture through said second arm adjacent said one end thereof, said snare material passing freely through said guide aperture.

5. The trap according to claim 1 in which said attaching end portion of said snare component freely engages through the other end of said trigger lever and extends to and is secured to said second arm adjacent said one end thereof.

6. The trap according to claim 2 in which said attaching end portion of said snare component freely engages through the other end of said trigger lever and extends to and is secured to said second adjacent said one end thereof.

7. The trap according to claim 5 in which said guide means comprises a guide aperture through said second arm adjacent said one end thereof, said snare material passing freely through said guide aperture.

8. The trap according to claim 6 in which said guide means comprises a guide aperture through said second arm adjacent said one end thereof, said snare material passing freely through said guide aperture.

9. The trap according to claim 5 which includes a sheave journalled for rotation on said other end of said trigger lever, said snare material engaging around said sheave.

10. The trap according to claim 6 which includes a sheave journalled for rotation on said other end of said trigger lever, said snare material engaging around said sheave.

11. The trap according to claim 7 which includes a sheave journalled for rotation on said other end of said trigger lever, said snare material engaging around said sheave.

12. The trap according to claim 8 which includes a sheave journalled for rotation on said other end of said trigger lever, said snare material engaging around said sheave.

* * * * *